US008615250B2

(12) United States Patent
Xing (10) Patent No.: US 8,615,250 B2
(45) Date of Patent: Dec. 24, 2013

(54) CENTRALIZED CONTROL OF COEXISTENCE OF MULTIPLE NETWORK OPERATORS

(75) Inventor: Hongnian Xing, Espoo (FI)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/346,015

(22) Filed: Jan. 9, 2012

(65) Prior Publication Data

US 2013/0178225 A1    Jul. 11, 2013

(30) Foreign Application Priority Data

Jan. 5, 2012    (GB) .................................. 1200126.9

(51) Int. Cl.
*H04W 72/04*    (2009.01)
(52) U.S. Cl.
USPC ........... 455/454; 455/450; 455/510; 370/281; 370/328; 370/231; 709/223
(58) Field of Classification Search
USPC .......... 455/450, 552.1, 550.1, 439, 435.1, 78, 455/41.2, 436, 454, 510; 370/331, 329, 370/328, 208, 252, 350, 476, 342, 344, 281, 370/335, 231, 395; 709/223; 375/267
See application file for complete search history.

(56) References Cited

U.S. PATENT DOCUMENTS 7,653,024 B2 *  1/2010  Dekorsy et al. ............... 370/329
7,843,870 B2 * 11/2010  Olfat ............................ 370/328
7,904,112 B2 *  3/2011  Bitran et al. ................ 455/552.1
7,929,468 B2 *  4/2011  Goldhamer .................. 370/280
7,978,711 B2 *  7/2011  Harrang et al. ............ 370/395.4
8,019,886 B2 *  9/2011  Harrang et al. ................ 709/232
8,064,475 B2 * 11/2011  Henry .......................... 370/433
2003/0026291 A1 *  2/2003  Engel ........................... 370/468
2007/0087756 A1 *  4/2007  Hoffberg ..................... 455/450
2011/0119593 A1 *  5/2011  Jacobson et al. ............. 715/736
2011/0299390 A1 * 12/2011  Liu .............................. 370/230
2011/0299479 A1 * 12/2011  Deb et al. .................... 370/329
2011/0300891 A1   12/2011  Deb et al. .................... 455/510

FOREIGN PATENT DOCUMENTS

WO   WO 2011/140462 A2   11/2011
WO   WO 2012/051157 A2   4/2012

OTHER PUBLICATIONS

"IEEE P802.19 Wireless Coexistence", IEEE 802.19-10/0055r3, Mar. 2010, 15 pgs.
"Overview of Research Projects with NYU-Poly", Rui Yang, InterDigital Communications, LLC, Nov. 12, 2010, 20 pgs.

(Continued)

*Primary Examiner* — Mahendra Patel
(74) *Attorney, Agent, or Firm* — Stanton IP Law (57) ABSTRACT

A first wireless network collects profiles of user equipments operating under the first wireless network associated with a first core network or operator; profiles of user equipments operating under a second wireless network associated with a second core network or operator; and measurement information of an unlicensed band. Based on the collected profiles and measurement information, allocating to the first wireless network and to the second wireless network resources on the unlicensed band. In various specific embodiments, there is also collected a pre-defined agreement which sets forth relative shares of the unlicensed band for the first wireless network and for the second wireless network; and the profiles of the user equipments each includes authentication and security information, and the respective profiles are utilized to control admission of the respective user equipments to the respective first and second wireless networks.

6 Claims, 7 Drawing Sheets

(56) References Cited

OTHER PUBLICATIONS

"Flexible Specturm Usage-How LTE Can Meet Future Capacity Demands", M-A. Phan et al., Ericsson AB, 2010, 28 pgs.

"Femtocell", http://en.wikipedia.org/wiki/Femtocell; Nov. 3, 2011, 9 pgs.

"Advances in Device-to-Device Communications and Network Coding for IMT-Advanced", Afif Osseiran et al., ICT-Mobile Summit 2009 Conference Proceedings, 2009, 8 pgs.

"Cognitive radio", http://en.wikipedia.org/wiki/Cognitive_radio, Nov. 3, 2011, 7 pgs.

"Network Sharing in LTE-Opportunity & Solutions", Alcatel-Lucent, 2010, 19 pgs.

\* cited by examiner

CENTRALIZED CONTROL OF COEXISTENCE OF MULTIPLE NETWORK OPERATORS

CROSS-REFERENCE TO RELATED APPLICATION

This application claims the benefit under 35 U.S.C. §119(a) and 37 CFR §1.55 to UK patent application no. GB1200126.9, filed on Jan. 5, 2012.

TECHNICAL FIELD

The exemplary and non-limiting embodiments of this invention relate generally to wireless communication systems, methods, devices and computer programs and, more specifically, relate to managing communications in license—exempt spectrum such as TV white spaces or the ISM band.

BACKGROUND

The following abbreviations that may be found in the specification and/or the drawing figures are defined as follows:
3GPP third generation partnership project
CA carrier aggregation
CC component carrier
CDIS co-existence discovery and information server
CE co-existence enabler
CM co-existence manager
CMOCU central multiple operator coordination unit
CN core network
D2D device to device
E-UTRAN evolved universal terrestrial radio access network (also LTE)
eNB evolved Node B (base station of a LTE/LTE-A system)
GWCN gateway core network
HSS home subscription server
ICIC inter-cell interference coordination
ID identity/identifier
ISM industrial, scientific and medical
LTE-A long term evolution advanced
MME mobility management entity
MOCN multi-operator core network
PGW packet gateway
PLMN public land mobile network
RAT radio access technology
SGW serving gateway
TVDB TV database
TVWS TV white space
WLAN wireless local area network Wireless radio network operators need to enable sufficient data rates for individual users to utilize different and evolving types of services, and to preserve quality of service as the density of users increase. Together this is seen as network capacity, and given the rapid expansion of data volume and service types now available over wireless networks. Maintaining sufficient network capacity is seen to be a critical challenge going forward.

Solutions to increase network capacity can be generalized into two categories: link level and network level. The best link level improvements have in the past decade been centered on coding technology. The Shannon capacity theory provides an upper limit for data rate at a given bandwidth, and so further capacity improvements from the link level perspective are somewhat limited.

Respecting network level capacity improvements, those can be divided into two types of optimizations: size and spectrum. Size optimization includes reducing the cell size, such as in cellular systems such as LTE reducing from the more traditional LTE macro cell to the LTE-A femto cell. Size optimization can also include utilizing other local communication schemes, such as D2D communications which represent still smaller 'cells' of communicating D2D devices. Spectrum optimization considers utilizing the available spectrum as efficiently as possible. Cognitive radio is a concept in which users opportunistically exploit 'holes' or unused portions of the radio spectrum for their communications, and falls within the spectrum optimization regime.

Cognitive radio is still a very general concept and it is quite difficult to optimize multiple different RATs over multiple frequency bands. This leads to a further division of the spectrum optimization techniques into coordination of multiple operators using the same RAT in the available frequency bands, and coordination of multiple RATs in the available frequency bands. As part of expanding network capacity there is research into utilizing license exempt frequency bands, sometimes termed shared bands or unlicensed spectrum, for regular communications. Therefore the above same or multiple RAT scenarios may be in licensed bands or in license-exempt bands. Examples of license exempt bands include the ISM bands and the TV whitespaces which the U.S Federal Communication Commission is considering making available for direct use by the general public.

The concept of carrier aggregation CA is well established in the wireless communication arts and has been undergoing development for the LTE/LTE-A systems. In CA the whole system bandwidth is carved into multiple component carriers CCs. Specific for LTE/LTE-A, each UE is to be assigned one PCell which remains active and one or more SCells which may or may not be active at any given time, depending on data volume for the UE and traffic conditions in the serving cell. At least one CC in the system is to be backward compatible with UE's which are not capable of CA operation.

The structure of the extension carrier is not yet determined; it may or may not have a control channel region, it may have only an abbreviated control channel region or it may have a full set of channels so as to be backward compatible with LTE Release 8. In any case the structure is under development for LTE Release 11 and some enhancements to the UL may be possible, particularly to better facilitate machine-type communications on such an extension carrier.

Figure 1:
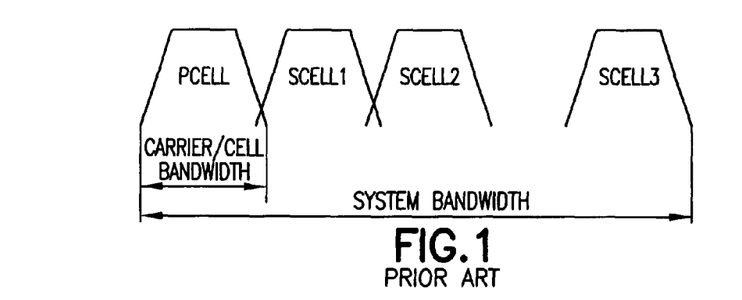
FIG. 1 is a schematic frequency diagram showing a carrier aggregation system in which some component carriers lay in a licensed band and some lay in unlicensed bands.

FIG. 1 illustrates the general CA concept for LTE/LTE-A. For a given UE there is assigned a PCell which by example is backward-compatible with LTE Release 8/9 UEs (and therefore 20 MHz in bandwidth though the various CCs may be defined by different bandwidths). That same UE may also have in its assigned set SCell#1, SCell#2 and SCell#3, which for completeness SCell#3 is shown as being non-contiguous in frequency with the other CCs. Any number of the SCells or none of them may be active for that UE at any given time, as coordinated with the eNB. Every UE is to have its assigned PCell always active, and so legacy UEs which are not CA-capable will be assigned one backward-compatible CC and no others.

One approach to prevent congestion of cellular core networks due to the ever-increasing volume of wireless data and number of wireless users is to utilize one or more SCells operating in the license-exempt spectrum. UEs operating in such a SCell will still be utilizing the same RAT as is used in the CCs operating in the licensed bands. But even when these multiple UEs operating in the license exempt band are operating with the same RAT, they may be controlled by different operators which interface with different core networks. In the LTE-A system one approach to exploiting the license-exempt band via CA is to have different LTE-A femto cells controlling that SCell and the UEs operating in that license-exempt SCell band. Relevant background in this regard, including an exposition of difficulties in coordinating different core networks, can be seen at a presentation by M-A Phan, H. Wiemann and J. Sachs entitled FLEXIBLE SPECTRUM USAGE—HOW LTE CAN MEET FUTURE CAPACITY DEMANDS (Ericsson Research, Ericsson Eurolab R&D; Aachen Germany; Jul. 8, 2010) and also in a paper by Rui Yang entitled OVERVIEW OF RESEARCH PROJECTS WITH NYU-POLY (InterDigital Communications, LLC; Melville, N.Y.; Nov. 12, 2010).

Currently, national roaming is used as the way for the UE to use resources from different operators on their licensed bands. One major disadvantage of national roaming is that the PLMN ID of the visited network is broadcasted on the air interface, meaning it is not transparent for the subscribers in roaming situation. In practice it is typical that national roaming is used as a way to support geographical split agreements between different operators. Each operator deploys its own network and uses its own spectrum, so in the predominant case of national licenses the whole available spectrum is not used. But where the LTE operators deploy networks on license-exempt bands, they need to co-operate in a tighter way so that the shared spectrum can be utilized in a reasonable and efficient way.

Figure 2A:
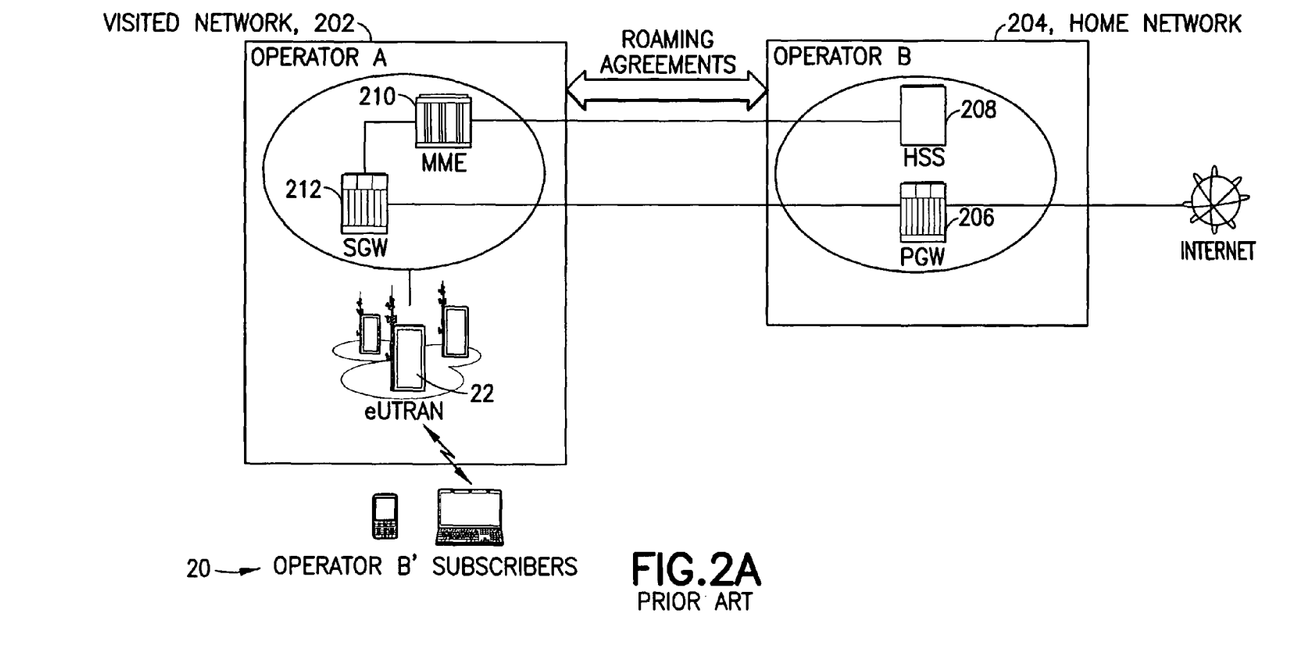
FIGS. 2A-B are prior art schematic diagrams illustrating two different ways for routing roaming traffic set forth in a white paper entitled network sharing in LTE (by Alcatel-Lucent, © 2010).
Figure 2B:
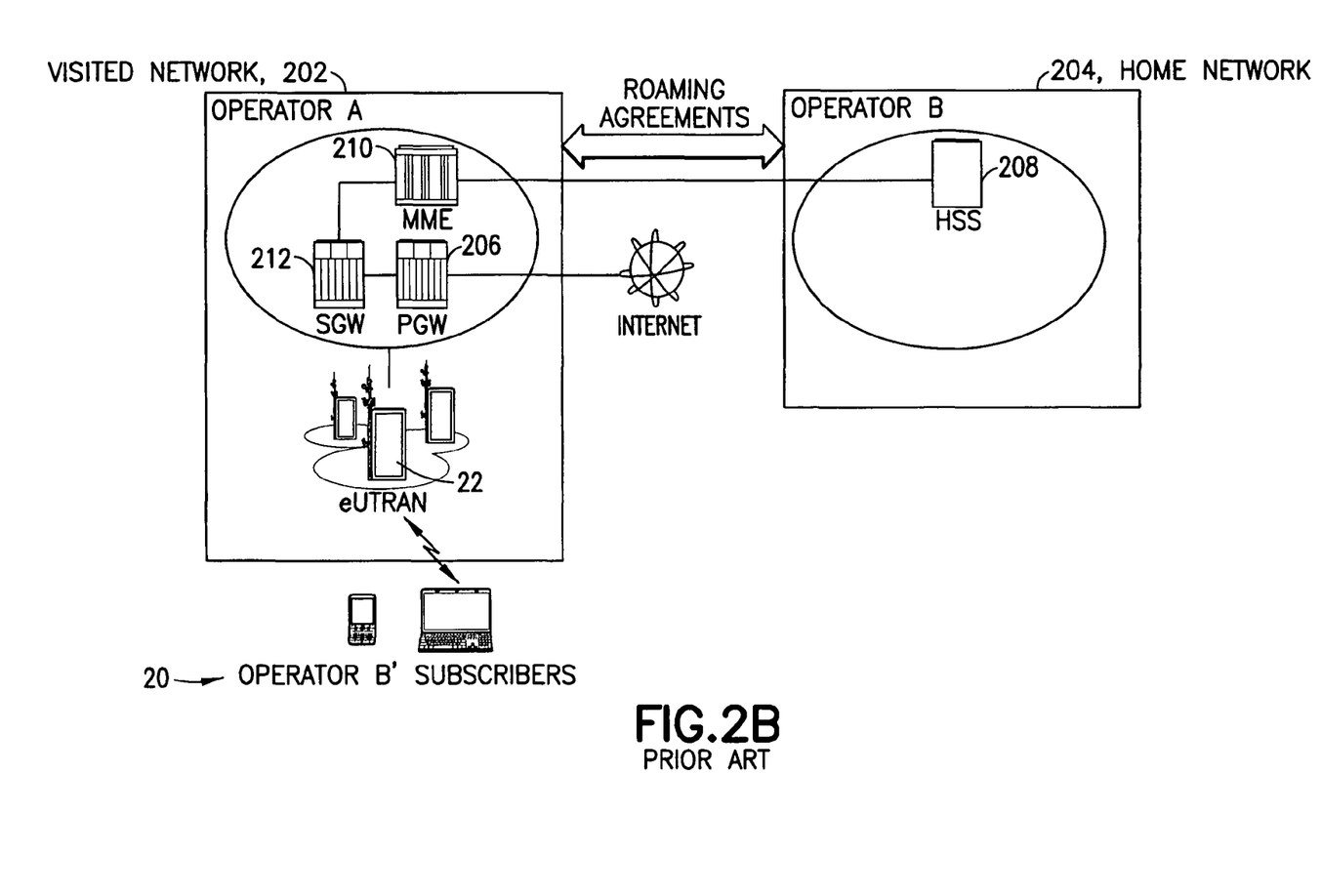

Generally there are two technical solutions for the coordination between different LTE operators on their licensed bands: national roaming and E-UTRAN sharing (for background see 3GPP TS 23.401 v8.6.0 and 3GPP TR 23.251 v8.1.0, respectively). There are also two general approaches for roaming in LTE: home routed traffic and local breakout. These two approaches differ on the location of the PGW, as is shown at FIGS. 2A-B. In the home routed traffic shown at FIG. 2A the PGW 206 is located in the home network 204 as opposed to the visited network 202. The visited network 202 serves as the CN (EPC) 202 for the visiting UE 20 operating under an eNB 22 in the E-UTRAN radio network. Thus in FIG. 2A traffic from the subscriber 20 is routed by the SGW 212 up to the home network 206. In the local breakout shown at FIG. 2B the PGW 206 is located in the visited network 202 as opposed to the home network 204. In this case traffic from the subscriber UE 20 is routed from the eNB 22 and through the SGW 212 locally to the PGW 206 at the level of the visited network 202. In both approaches the HSS 208 is located in the home network 204, and has the roaming agreements with the MME 210 at visited network.

Figure 2C:
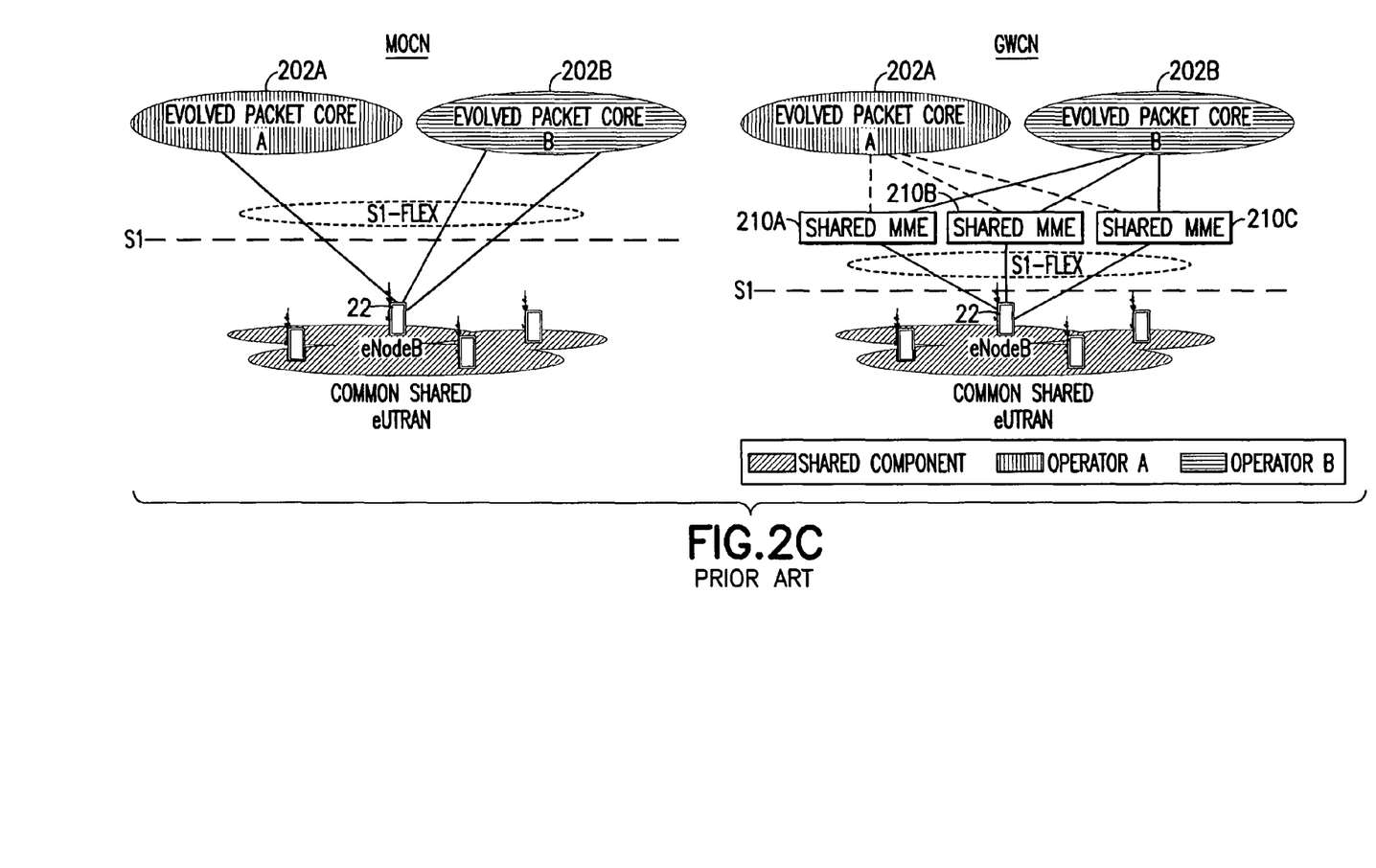
FIG. 2C is a schematic diagram illustrating two different approaches for EUTRAN sharing according to the prior art.

E-UTRAN sharing means the eNB is shared by different operators. E-UTRAN sharing also has two main approaches as shown at FIG. 2C: MOCN and GWCN. In the MOCN approach at the left side of FIG. 2C the shared E-UTRAN (represented by multiple eNBs 22) is connected to several CNs 202a, 202b via the S1 interface. Each mobile network operator has its own EPC, and so the MME, the SGW and the PGW are not shared and are located in the different CNs 202a, 202b. In this case, the load balance is possible between MME and SGW of a given CN 202a, 202b. In the GWCN approach at the right side of FIG. 2C, the MME is also shared between the different mobile network operators and so there are shown multiple MMEs 210a, 210b, 210c. In current practice the roaming and E-UTRAN sharing are mainly used for the operators within their own licensed bands.

Figure 3:
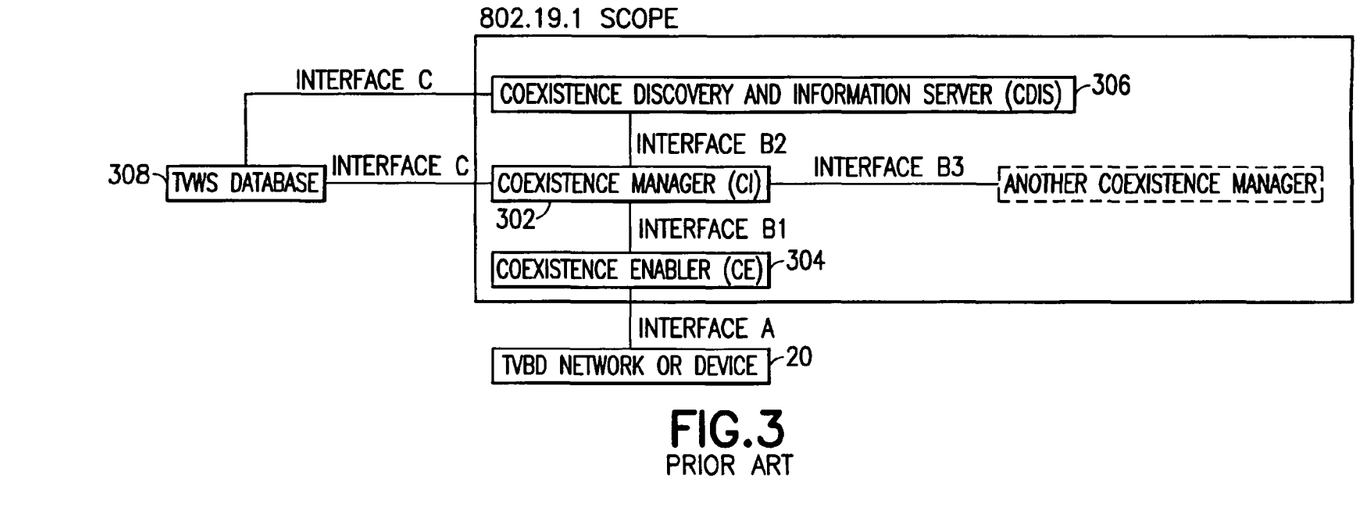
FIG. 3 is a prior art diagram of an IEEE coexistence manager.

In addition to the LTE approaches shown at FIGS. 2A-C, an IEEE working group under IEEE 802.19.1 has been investigating a more general concept for network sharing, shown diagrammatically at FIG. 3 which is roughly reproduced from FIG. 2 of document IEEE 802.19-10/0055r3 (March 2010; entitled IEEE P802.19 WIRELESS COEXISTENCE). In this architecture there is a central control unit having functions of a coexistence manager CM 302, a gateway/server unit having functions of a coexistence enabler CE 304, and a storage unit which functions as a coexistence discovery and information server CDIS 306. The CM 302 and/or the CDIS 306 can interface with a TV whitespace database 308 to find where there have been reports of available spectrum in the license-exempt band, and the CE 304 interfaces with the UEs 20 which operate in the license-exempt bands. The CE 304 is therefore used as a gateway, including providing responses for the registration and translation. The CM 302 is the main control unit to design and process coordination algorithms and functions. The CDIS 306 is the storage unit to save and provide necessary users data. The coexistence architecture of FIG. 3 has been proposed for the coexistence of different IEEE 802 types of wireless applications.

SUMMARY

The foregoing and other problems are overcome, and other advantages are realized, by the use of the exemplary embodiments of this invention.

In a first exemplary embodiment of the invention there is an apparatus comprising at least one processor and at least one memory storing a computer program. In this embodiment the at least one memory with the computer program is configured with the at least one processor to cause the apparatus to at least: collect at a first wireless network profiles of user equipments operating under the first wireless network associated with a first core network or operator, profiles of user equipments operating under a second wireless network associated with a second core network or operator, and measurement information of an unlicensed band. They are further configured to cause the processor to, based on the collected profiles and measurement information, allocate to the first wireless network and to the second wireless network resources on the unlicensed band.

In a second exemplary embodiment of the invention there is a method comprising: collecting at a first wireless network profiles of user equipments operating under the first wireless network associated with a first core network or operator, profiles of user equipments operating under a second wireless network associated with a second core network or operator, and measurement information of an unlicensed band; and based on the collected profiles and measurement information, allocating to the first wireless network and to the second wireless network resources on the unlicensed band.

In a third exemplary embodiment of the invention there is a computer readable memory tangibly storing a computer program executable by at least one processor, the computer program comprising: code for collecting at a first wireless network profiles of user equipments operating under the first wireless network associated with a first core network or operator, profiles of user equipments operating under a second wireless network associated with a second core network or operator, and measurement information of an unlicensed band. The program further includes code for allocating to the first wireless network and to the second wireless network resources on the unlicensed band based on the collected profiles and measurement information.

DETAILED DESCRIPTION

These teachings provide a solution for the coordination of multiple operators running the same RAT for the license exempt band such as ISM bands or TV white spaces. While the specific examples are in the context of the LTE technology this is for clarity of explanation and is not limiting to the broader teachings herein for coordinating radio operations in the license exempt band. For the specific LTE implementation the solution presented herein is based utilizing extending the MME function to coordinate the core networks, rather than by radio link coordination as is the case with current iterations of LTE as shown at FIGS. 2A-C. For other RATs the MME function may be referred to by a different name, such as for example in the UTRN system a similar function may be handled by the radio network controller RNC, or in other types or RATs this functionality may reside in some other network node hierarchically above the radio access node/base station.

In accordance with these teachings there is a high layer coordination scheme and related functional architecture for multiple (LTE) radio network operators which are operating on the license exempt band (sometimes alternatively referred to as the unlicensed or shared band). In this approach the CN of one of the coordinated LTE operators is assigned as the coordination center. The functions of MME (and its relative blocks) are extended in the selected CN as compared to the conventional/prior art MME functions so that the extended MME coordinates the different radio network operators on the same license exempt band. In addition to the conventional/prior art intra-MME connections inside a single CN, there are in these embodiments also inter-MME connections which carry the transmissions of essential commands and information. The intra-MME connections between MMEs of the same operator/same CN, in combination with the inter-MME connections between different CNs, provides a flexible and reliable architecture to utilize the license exempt bands without interference between the CNs which are subject to the coordination.

Figure 4:
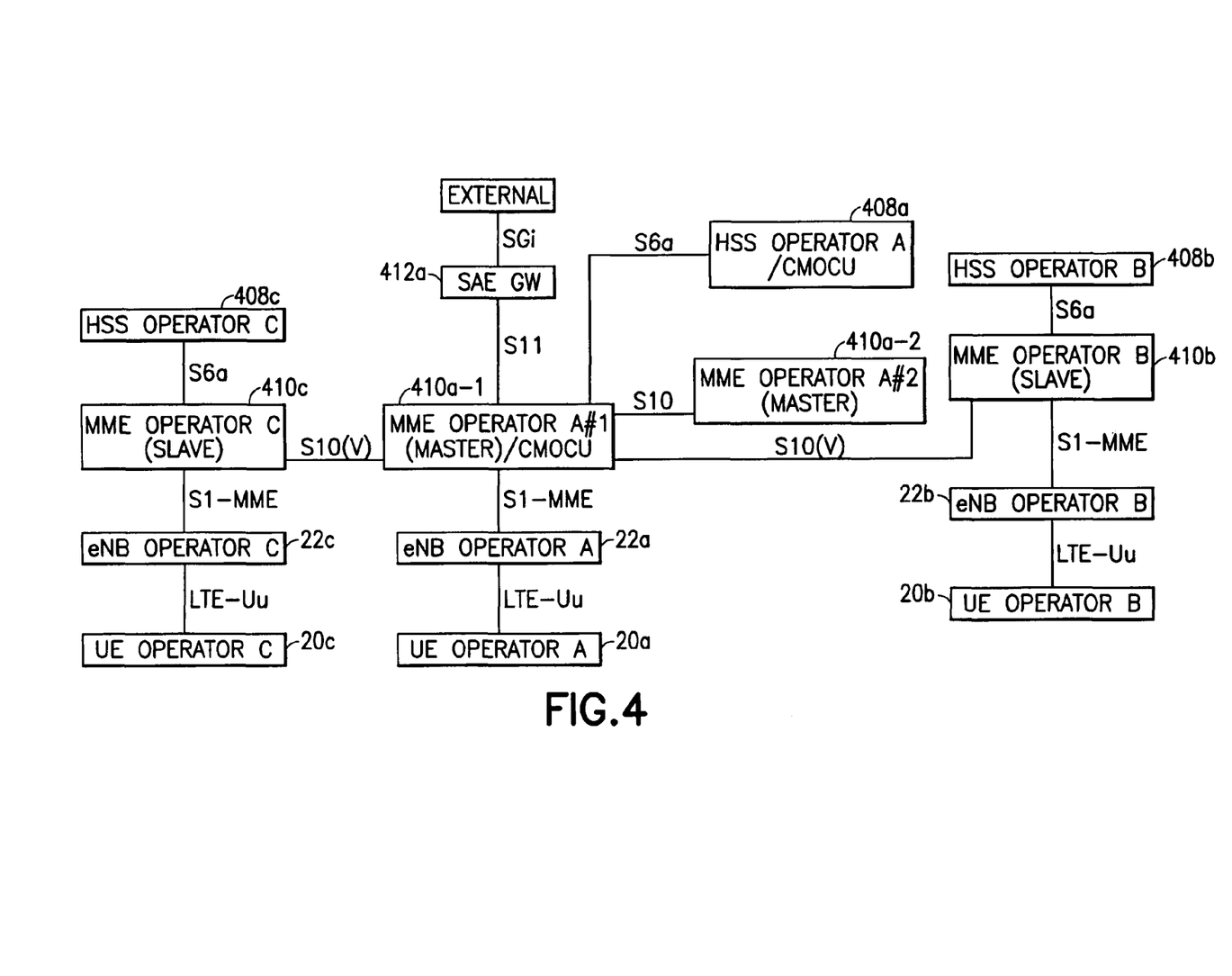
FIG. 4 is a high level block diagram of a master operator network coordinating operations on the unlicensed band for itself and for two slave operator networks according to an exemplary embodiment of these teachings.

First is detailed the process by which the different network nodes of the interfacing architecture shown at FIG. 4 interact so as to coordinate radio operations among the different CNs whose UEs are operating in the same license exempt band. Following are detailed specific functions and actions for those network nodes.

As an overview, the necessary information for the multiple operator coordination process itself is done at one CN, which FIG. 4 identifies as the master CN which is operator A. Also shown at FIG. 4 as operator B and operator C are two other CNs. Inside the master CN, there is a central multiple-operator coordination unit (CMOCU 410a-1) which is merged into one or several of the MMEs 410a-2 and HSSs 408-a. The extended function of MME 410a-1 mentioned above realizes the coordination algorithms, and the extended function of the HSS 408a is to collect and store the necessary information for that coordination which the MME puts into effect.

In general terms the inter-CN coordination process may be divided into three main portions: information collection, coordination decision, and decision execution. The coordination process begins with the collection of the necessary information, but note this collection is an ongoing process and so includes initial information collection and storage as well as updating that initial information. Then there is a coordination decision which is based on the collected information, and finally the coordination decision is executed and feedback is provided. Reference numbers in the more detailed description below refer to FIG. 4.

Information Collection, Storage and Update.

In each operator network the necessary information is collected by that CN's respective MME 410a-1 (or 410a-2/410b/410c) through different tunnels S1-MME, and stored (and updated) at the respective HSS 408a/408b/408c. The authentication and security related information from different operators is collected from the HSSs 408a/408b/408c via the respective MMEs 410a-2/410b/410c using the indicated S6a and S10 interfaces. This information is then stored at the HSS 408a of the master CN. In this case, the HSS 408a at the master CN will not only store the EUTRAN and attached UE profiles from its own CN (operator A), but also the profiles from other CNs (operators B and C) This information can be geographic location based.

Resource related and other coordination related information is also collected from the external networks through the system architecture evolution gateway SAE GW 412a via the SGi interface and via the S11 interface. Only the master CN needs this capability since it is the only system to make the coordination decisions. In an exemplary embodiment similar coordination related information is also collected from the E-UTRANs and UEs of other operators B and C. This requires that the slave MMEs 410b/410c collect this information, such as measurement reports from the EUTRAN and their respective UEs, and send it to the master MME 410a-1 via the s10 (V) interface.

All this information is stored at the master HSS 408a and is updated by the master MME 410a-1 regularly, meaning the slave MMEs 410b/410c send their updates regularly.

Coordination Algorithms and Decisions.

The master MME 410a-1 has the extended functionality to perform the coordination decisions, such as by executing an algorithm for this functionality. The coordination algorithms include admission control, resource control, and so forth. These decision algorithms are designed based on the pre-defined agreements between operators A, B and C, and the available parameters can be obtained from respective MME 410a-2/410b/410c and HSS 408a/408b/408c. For example, assume the pre-defined agreement provides the shares for each operator on a shared band (otherwise known as unlicensed or license exempt spectrum). The external network and the neighbor measurement reports from different operators then will provide the current status of the spectrum/channel and any interference information that's been collected. Based on this information, the master MME 410a-1 is able to make a decision about how to allocate the suitable shared frequency band/channels for each coordinated EUTRAN.

The coordination tasks can be shared between multiple MMEs in the selected CN such as the two MMEs 410*a*-1 and 410*a*-2 for the master operator A in FIG. 4. This enables the master network to balance the computational load between them. However this depends on there being multiple MMEs in the master network available so in other embodiments the single MME 410*a*-1 performs all of the tasks required to run the coordination decision algorithms.

Since the coordination is related to multiple MMEs 410*a*-1/410*b*/410*c* from multiple operators, it is possible that the eventual decision might be rejected by one or more of the slave MMEs 410*b*/410*c*. In this case it is unwise to re-visit that rejected decision for all the slave MMEs 410*b*/410*c* (which would include also a number of slave MMEs who accept the original decision). To resolve this there must be left sufficient backup resources once the coordination decision is considered. The normal (prior art) functions of the MME and HSS are not affected, at either the master CN or the slave CNs; it is only additional functionalities that are added. For example, the master MME 410*a*-1/410*a*-2 will not provide the mobility/handover function for the UEs of other operators B and C even though their attached MMEs 410*b*/410*c* are slaved to this master MME 410*a*-1 in these embodiments.

Execution of the Coordination Decisions and Feedback.

After the coordination decisions have been made, the master MME 410*a*-1 will deliver the decision to the slave MMEs 410*b*/410*c*, and the slave MMEs 410*b*/410*c* will forward those decisions to the attached EUTRANs 22*b*/22*c* and UEs 20*b*/20*c*. After the decisions have been accepted and executed at the slave MME side, the EUTRANs 22*b*/22*c* and UEs 20*b*/20*c* of slave MMEs 410*b*/410*c* will provide the necessary measurement and performance reports. This information is collected by the respective slave MMEs 410*b*/410*c* and forwarded to the master MME 410*a*-1 for making the new decisions for the next round. If the coordination decision cannot be accepted by the slave MME 410*b*/410*c* (or by the ETURAN 22*b*/22*c* attached to a respective slave MME 410*b*/410*c*), a reject message can be sent to the master MME 410*a*-1 for requesting a new decision.

Respecting the master MME 410*a*-1, this element has the functions of authentication, security, mobility management, management of subscription profile and service connectivity. Whichever MME is selected as the master MME 410*a*-1 also coordinates multiple LTE operators by collecting information from other MMEs 410*b*/410*c* and from external networks. The administration of different types of information can be done at the master MME side, or in another embodiment the that master MME 410*a*-1 can simply forward that collected information to the HSS 408*a* for the administration process in which case the processed (valid) information will then be obtained by the master MME 410*a*-1 from the HSS 408*a*. The master MME 410*a*-1 also provides the coordination algorithms and make the coordination decisions. As detailed above, the algorithms are based on the pre-defined agreements between core network operators, and on the information obtained from internal and external networks. The master MME 410*a*-1 then communicates its decisions to the slave MMEs 410*b*/410*c*. If the decision is rejected by a slave MME 401*b*/410*c*, the decision for the particular rejecting slave MME 410*b*/410*c* has to be remade but need not be re-decided for those slave MMEs 410*b*/410*c* which did not reject it.

It is convenient due to the property of core network coordination that the coordination decisions are generally persistent or at least semi-persistent. For example, the pre-defined agreement between operators is usually a fixed one so decisions based on such agreements should be persistent. Those decisions based on the feedback from MMEs 410*b*/410*c* may be semi-persistent. In principle, at least some of the coordination decisions allow no freedom for the slave MMEs 410*b*/410*c* (and the EUTRANs 22*a*/22*b*/22*c*) to make their own decisions. This is subject to some limitation and exception as to certain types of decisions.

Slave MME 410*b*/410*c* are slightly modified according to these teachings for the extra task of collecting the necessary coordination information (such as measurement and status reports from their respective UEs 20*b*/20*c* and ETURANs 22*b*/22*c*, and forwarding that information to the master MME 410*a*-1. In the reverse direction they are also modified to forward the coordination decisions to their respective attached ETURANs 22*b*/22*c* and UEs 20*b*/20*c*.

The master HSS 408*a* operates as the subscription data repository for all permanent user data, and also records the location of the users 20*b*/20*c* in the level of the visited network control node, such as the MME 410*b*/410*c* (e.g., the master HSS 408*a* records which UE 20*b*/20*c* is in a visited network). Preferably the master HSS 408*a* is embodied as a database server maintained centrally in the master network operator's premises.

For coordination the master HSS 408*a* also stores and updates the data from its coordinated operators B and C. While the conventional HSS also stores and maintains data the new function here is to store and maintain the data from other network operators, not only its home network. As noted above, in some embodiments the master HSS 408*a* may also process the collected data from other operators, for example in order to relieve some processing load from the master MME 410*a*-1. Also note that in general for the coordinated operators, there is no longer a need for roaming but the conventional roaming function need not be impacted by this master/slave operator coordination. The slave HHSs 408*b*/408*c* may be conventional without modification.

In conventional practice the MME connections from the same operator provide the functions of handover between MMEs, and take care of the idle state mobility between MMEs. The inter MME connections between different CNs become quite important when the central multiple operator coordination unit CMOCU is deployed. For example, the inter MME connection has to be established in order to obtain the necessary information and to forward the coordination decisions as detailed above.

The conventional S10 interface between MMEs is extended according to these teachings. A pre-defined agreement between operators and possible modification of current protocols may be needed to extend this S10 interface so that it not only interfaces between MMEs inside the same operator but also interfaces between different operators from different CNs, as shown by the s10(V) interfaces in FIG. 4. The designator (V) represents a virtual tunnel which in an embodiment is built based on the requests to higher layers from the cooperating operators. In this case, the S-10(V) tunnel is built only when some inter MME connection is needed, which though a bit more complex to implement in practice are less significant changes to existing protocol architectures.

The S1-MME connection shown at FIG. 4 is conventional, but is used to exchange extra information between a given EUTRAN 22*a*/22*b*/22*c* its attached MME(s) 410*a*-1/410*a*-2/410*b*/410*c* for the coordination. This is seen as quite simple to implement in practice, both from the connection and from the protocol perspective.

There is also shown in FIG. 4 an external network connection SGi: The master MME 410*a*-1 (or the master HSS 408*a*)

use this interface SGi to collect the necessary information from any external networks for coordination purposes. As shown in FIG. 4, this connection uses the system architecture evolution gateway SAE GW 412a (including the serving gateway SGW and packet data network gateway PGW). This requires a bit of modification since conventionally the connection protocols for the SAE GWs are usually used for the users data, and in these teachings they are expanded to also pass control signaling.

One technical effect of certain embodiments of these teachings is that they utilize the current CN architecture (MME, HSS, SAE GW and its intra- and inter-connections) and so the existing architecture can be utilized with the above modifications for the coordination of different operators as detailed above. Also, since the coordination is based on the same RAT, the coordination workload is significantly smaller than a similar coordination workload to coordinate among different RATs, so it is possible for a single CN to handle all the same-RAT coordination work in a given geographical certain area. Unlike the conventional EUTRAN sharing, all the eNBs and access points APs can be used without modification since the centralized management system is done at the level of the CN. The measurement reports from the EUTRAN 22a/22b/22c and the UEs 20a/20b/20c of different operators can be collected through the inter MME connections S-10(V), so the decisions based on those measurements will be more accurate than decisions based on measurements from only one operator.

An additional technical advantage is that since the central management system is merged into the MME 410a-1 or MMEs 410a-1/410a-2 of one (master) operator, the more significant modifications are required for the selected master CN/operator. The extra processing load for the selected CN/operator due to the modifications according to these teachings may be compensated somewhat by the agreement between different operators, or by some other means such as monetary or granting the master operator a greater share of radio resources.

The above advantages are seen to well outweigh having to modify the selected (master) CN and the corresponding protocols. There is the potential that the high layer coordination according to these teachings may induce some static process so that the system/spectrum efficiency is a bit reduced, but this can be well controlled by a good design of the decision algorithms and the parameters they use.

Figure 5:
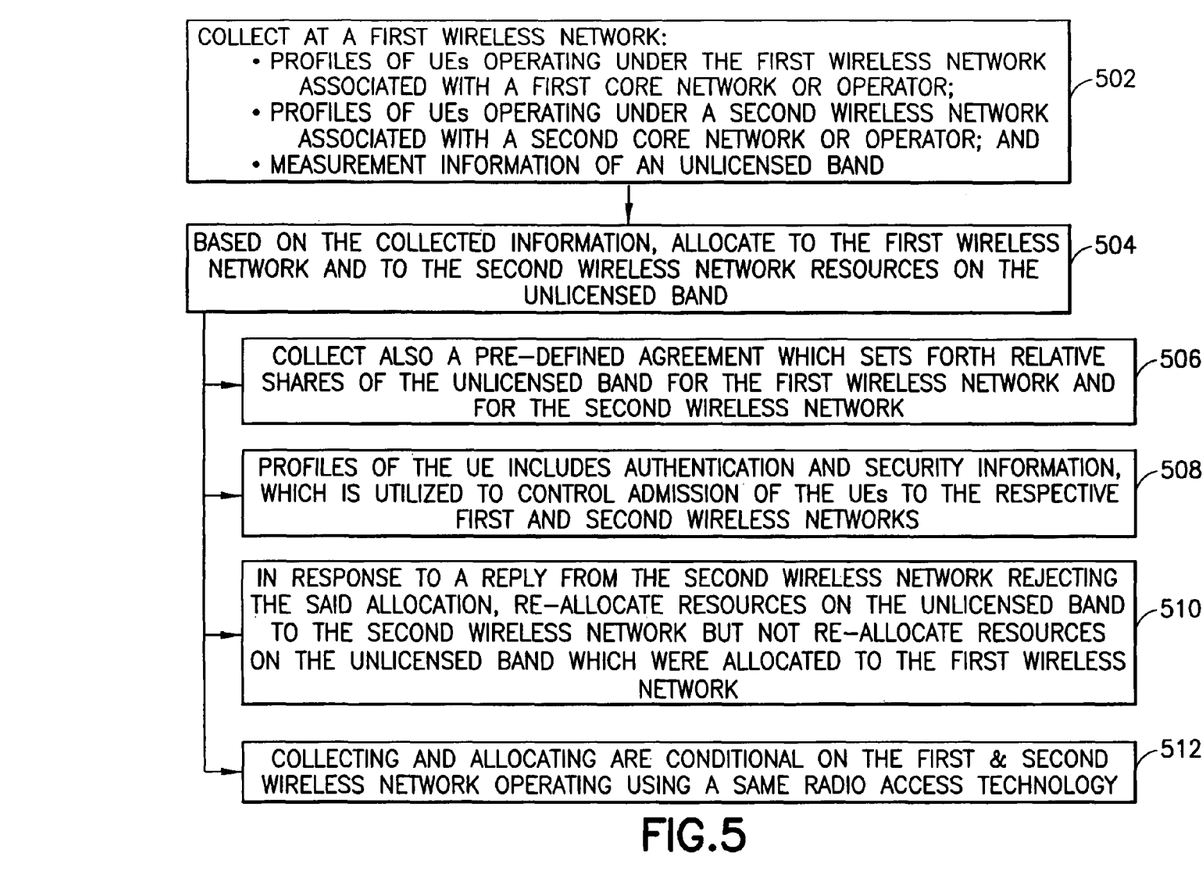
FIG. 5 is a logic flow diagram that illustrates from the perspective of the master network of FIG. 4 the operation of a method, and a result of execution of computer program instructions embodied on a computer readable memory, in accordance with an exemplary embodiment of this invention.

Now are detailed with reference to FIG. 5 further particular exemplary embodiments from the perspective of the user equipment. FIG. 5 may be performed by the whole MME 410a-1, or by one or several components thereof such as a modem, a processor in combination with a software program tangibly stored on a memory, or any sub-combination of functional blocks shown at FIG. 5. If we consider the master operator network as a first wireless network and only refer specifically to one slave network and call it the second wireless network, then at block 502 the master MME 410a-1 collects profiles of UEs operating under the first wireless network which is associated with a first core network or operator, and collects profiles of UEs operating under a second wireless network which is associated with a second core network or operator. The profile of a user equipment is defined as a set of UE parameters used for the MME multi-operator coordination. Besides all/part of the UE parameters for the conventional MME operations, the profile can also include extra UE parameters from the radio access network or core network if they are required by the MME for the coordination. The master MME 410a-1 also collects measurement information of an unlicensed band. Then at block 504, based on the collected information (the profiles and the measurement information) the master MME 410a-1 allocates to the first wireless network and to the second wireless network resources on the unlicensed band.

Further portions of FIG. 5 represent various of the specific but non-limiting embodiments detailed above. At block 506 there is added to the information collected at block 502 also a pre-defined agreement which sets forth relative shares of the unlicensed band for the first wireless network and for the second wireless network. Block 508 gives the embodiment in which the profiles of the UEs, which include authentication and security information, are utilized by the master MME 410a-1 to control admission of the respective UEs to the respective first and second wireless networks. The embodiment in which a slave network rejects an allocation is summarized at block 510, where in response to a reply from the second wireless network rejecting the said allocation, re-allocating resources on the unlicensed band to the second wireless network but not re-allocating resources on the unlicensed band which were allocated to the first wireless network. And finally block 512 recognizes that the master MME 410a-1 can only perform this coordination function for other EUTRANs, and so the collecting and allocating are conditional on the first wireless network and the second wireless network operating using a same radio access technology.

Another embodiment not shown at FIG. 5 include that the allocation of the resources is decided based on the collected information as retrieved from a home subscription server 408a.

FIG. 5 is a logic flow diagram which may be considered to illustrate the operation of a method, and a result of execution of a computer program stored in a computer readable memory, and a specific manner in which components of an electronic device are configured to cause that electronic device to operate. The various blocks shown in FIG. 5 may also be considered as a plurality of coupled logic circuit elements constructed to carry out the associated function(s), or specific result of strings of computer program code stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Figure 6:
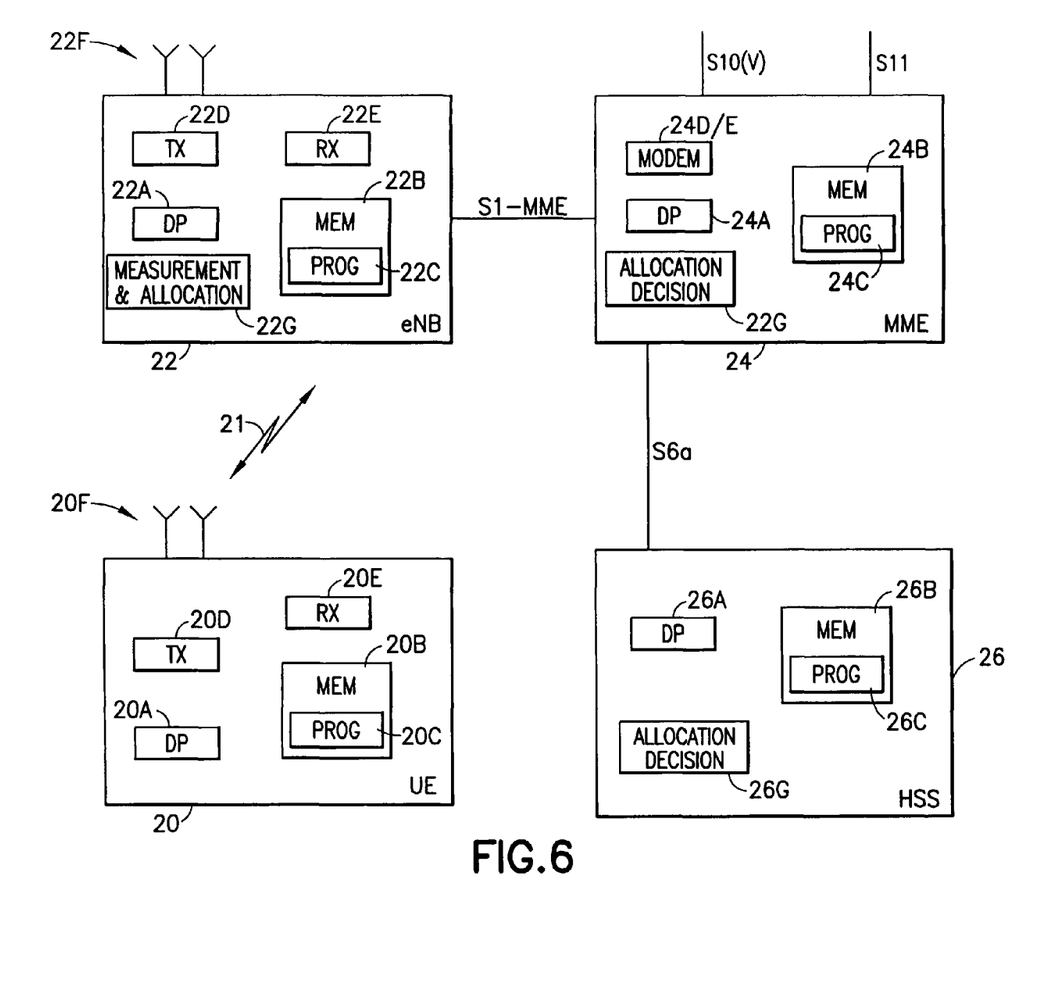
FIG. 6 is a simplified block diagram of a UE, an eNB and a MME in the master network of FIG. 4, which are exemplary electronic devices suitable for use in practicing the exemplary embodiments of this invention.

Reference is now made to FIG. 6 for illustrating a simplified block diagram of various electronic devices and apparatus that are suitable for use in practicing the exemplary embodiments of this invention. In FIG. 6 there is a first/master wireless network (serving cell/eNB 22a and master mobility management entity MME 24a and HSS 26 if an LTE system) is adapted for communication over a wireless link 21 with an apparatus, such as a mobile terminal or UE 20. The mobility management entity 24 may provide connectivity with further networks such as for example a publicly switched telephone network PSTN and/or a data communications network/Internet over the S11 interface, and is communicatively coupled to other slave MMEs of other wireless networks via the illustrated S10(V) interface.

The UE 20 includes processing means such as at least one data processor (DP) 20A, storing means such as at least one computer-readable memory (MEM) 20B storing at least one computer program (PROG) 20C, communicating means such as a transmitter TX 20D and a receiver RX 20E for bidirectional wireless communications with the eNB 22 via one or more antennas 20F.

The wireless access node/eNB 22 is in the position of the EUTRAN 22a of FIG. 4 and also includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with the UE 20 via one or more antennas 22F. The eNB 22 collects measurements from its own UEs 20 for sending toward the master MME 24 and allocates to its UEs 20 the resources in the unlicensed band according to the allocation decision made by the master MME 24. There is also a data and/or control path S1-MME coupling the eNB 22 to the mobility management entity 24.

Similarly, the mobility management entity 24 includes processing means such as at least one data processor (DP) 24A, storing means such as at least one computer-readable memory (MEM) 24B storing at least one computer program (PROG) 24C, and communicating means such as a modem 24D/E for bidirectional communications with the eNB 22, with outside networks (through a SAE GW) via the interface S11, and with slave MMEs via interface S10(V). While not particularly illustrated for the UE 20 or eNB 22 those devices are also assumed to include as part of their wireless communicating means a modem which may be inbuilt on an RF front end chip within those devices 20, 22 and which also carries the TX 20D/22D and the RX 20E/22E. the master MME 24 has a functional block 24G with decision logic to run the algorithms for deciding the unlicensed band resource allocation as detailed more fully above.

The HSS 26 similarly has a MEM 26G storing a PROG 26C which is executable by at least one DR 26A, and as noted above may also have a functional block 26G similar to that described above for the MME 24G.

At least one of the PROGs 24C/26C in the MME 24 or HSS 26 is assumed to include program instructions that, when executed by the associated DP 24A/26A, enable the device to operate in accordance with the exemplary embodiments of this invention, as will be discussed below in greater above. In these regards the exemplary embodiments of this invention may be implemented at least in part by computer software stored on the MEM 24B, 26B which is executable by the DP 24A of the MME 24 and/or by the DP 26A of the HSS 26; or by hardware, or by a combination of tangibly stored software and hardware (and tangibly stored firmware). Electronic devices implementing these aspects of the invention need not be the entire MME 24 or HSS 26, but exemplary embodiments may be implemented by one or more components of same such as the above described tangibly stored software, hardware, firmware and DP, or a system on a chip SOC or an application specific integrated circuit ASIC or a digital signal processor DSP.

Various embodiments of the computer readable MEMs 20B/22B/24B/26B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A/22A/24A/26A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the E-UTRAN (LTE/LTE-A) system, it should be appreciated that the exemplary embodiments of this invention are not limited for use with only this one particular type of wireless communication system, and that they may be used to advantage in other wireless communication systems such as for example GERAN, UTRAN and others which may access the unlicensed spectrum.

Some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. An apparatus comprising:
at least one processor, and at least one memory storing a computer program; in which the at least one memory with the computer program is configured with the at least one processor to cause a mobility management entity to at least:
collect at the mobility management entity:
profiles of user equipments operating under different wireless networks associated with different core networks or different operators, all of which operate using a same radio access technology (RAT), each profile comprising at least parameters for multi-operator coordination; and
measurement information of an unlicensed band;
based on the collected profiles and measurement information, allocate to the different wireless networks radio resources on the unlicensed band; and
in response to a reply from one of the different wireless networks rejecting the said allocation, re-allocate resources on the unlicensed band to the one wireless network from which the reply was received but not re-allocate resources on the unlicensed band which were allocated to any of the different wireless networks other than the one wireless network from which the reply was received;
wherein the different wireless networks are evolved universal terrestrial radio access networks (EUTRANs), and the radio resources are allocated to the different wireless networks:
according to a pre-defined agreement collected by the mobility management which sets forth relative shares of the unlicensed band for the different wireless networks; or
as decided by the mobility management entity based on the profiles and the measurement information which the mobility management entity retrieves from a home subscription server and from other mobility management entities of the different wireless networks.

2. The apparatus according to claim 1, in which the profiles of the user equipments each includes authentication and security information,
and the least one memory with the computer program is configured with the at least one processor to cause the mobility management entity to utilize the respective profiles to control admission of the respective user equipments to the respective different wireless networks.

3. A method for operating a mobility management entity, the method comprising:
- collecting by the mobility management entity:
  - profiles of user equipments operating under different wireless networks associated with different core networks or different operators, all of which operate using a same radio access technology (RAT), each profile comprising at least parameters for multi-operator coordination; and
  - measurement information of an unlicensed band;
- based on the collected profiles and measurement information, allocating by the mobility management entity to the different wireless networks radio resources on the unlicensed band; and
- in response to a reply from one of the different wireless networks rejecting the said allocation, the mobility management entity re-allocating resources on the unlicensed band to the one wireless network from which the reply was received but not re-allocating resources on the unlicensed band which were allocated to any of the different wireless networks other than the one wireless network from which the reply was received;
- wherein the different wireless networks are evolved universal terrestrial radio access networks (EUTRANs), and the radio resources are allocated to the different wireless networks:
  - according to a pre-defined agreement collected by the mobility management entity which sets forth relative shares of the unlicensed band for the different wireless networks; or
  - as decided by the mobility management entity based on the profiles and the measurement information which the mobility management entity retrieves from a home subscription server and from other mobility management entities of the different wireless networks.

4. The method according to claim 3, in which the profiles of the user equipments each includes authentication and security information,
and the method further comprises the mobility management entity utilizing the respective profiles to control admission of the respective user equipments to the respective different wireless networks.

5. A computer readable memory storing a computer program executable by at least one processor, in which the computer readable memory and the at least one processor are disposed within a mobility management entity, the computer program comprising:
- code for collecting at the mobility management entity:
  - profiles of user equipments operating under different wireless networks associated with different core networks or different operators, all of which operate using a same radio access technology (RAT), each profile comprising at least parameters for multi-operator coordination; and
  - measurement information of an unlicensed band;
- code for allocating to the different wireless networks radio resources on the unlicensed band based on the collected profiles and measurement information; and
- code, executable in response to a reply from one of the different wireless networks rejecting the said allocation, for re-allocating resources on the unlicensed band to the one wireless network from which the reply was received but not re-allocating resources on the unlicensed band which were allocated to any of the different wireless networks other than the one wireless network from which the reply was received;
- wherein the different wireless networks are evolved universal terrestrial radio access networks (EUTRANs), and the radio resources are allocated to the different wireless networks:
  - according to a pre-defined agreement collected by the mobility management entity which sets forth relative shares of the unlicensed band for the different wireless networks; or
  - as decided by the mobility management entity based on the profiles and the measurement information which the mobility management entity retrieves from a home subscription server and from other mobility management entities of the different wireless networks.

6. The computer readable memory according to claim 5, in which the profiles of the user equipments each includes authentication and security information, and the computer program further comprises:
- code for utilizing the respective profiles to control admission by the mobility management entity of the respective user equipments to the respective different wireless networks.

* * * * *